United States Patent [19]
Iwasaki

[11] Patent Number: 6,078,975
[45] Date of Patent: *Jun. 20, 2000

[54] DATA INPUT/OUTPUT APPARATUS, DATA INPUT/OUTPUT METHOD, DATA RECORDING AND REPRODUCING APPARATUS, AND DATA RECORDING AND REPRODUCING METHOD

[75] Inventor: Yasuo Iwasaki, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/974,561

[22] Filed: Nov. 19, 1997

[30] Foreign Application Priority Data

Nov. 19, 1996 [JP] Japan .................................. 8-308407

[51] Int. Cl.[7] .................................................. G06F 13/372
[52] U.S. Cl. ........................................... 710/124; 713/600
[58] Field of Search ........................... 395/841; 710/101, 710/117, 109, 123, 124, 125; 713/600

[56] References Cited

U.S. PATENT DOCUMENTS

| | | | |
|---|---|---|---|
| 4,161,786 | 7/1979 | Hopkins | 710/45 |
| 4,969,120 | 11/1990 | Azevedo | 710/117 |
| 5,278,974 | 1/1994 | Lemmon | 713/600 |
| 5,499,341 | 3/1996 | Wilson | 395/841 |
| 5,751,709 | 5/1998 | Rathnavelu | 370/395 |
| 5,784,569 | 7/1998 | Miller | 395/200.65 |

*Primary Examiner*—Eric Coleman
*Attorney, Agent, or Firm*—Frommer Lawrence & Haug, LLP; William S. Frommer

[57] ABSTRACT

A data recording and reproducing apparatus capable of coping with various applications has been difficult to be realized. In the data recording and reproducing apparatus, a plurality of first input/output sections, a data recording and reproducing section for recording data transmitted via a data bus from the first input/output sections on the recording medium while reproducing data recorded on the recording medium to transmit the data to the corresponding first input/output section via the data bus, and a control means for giving a useful right for the data bus to each of the input/output sections by a predetermined time in order are connected to one data bus, with the result that each of the input/output sections occupies the data bus only when the useful right is given from the control section, to transmit the data to the data recording and reproducing section via the data bus within the predetermined time or to take in the data which is transmitted via the data bus from the data recording and reproducing section.

14 Claims, 7 Drawing Sheets

DATA INPUT/OUTPUT APPARATUS, DATA INPUT/OUTPUT METHOD, DATA RECORDING AND REPRODUCING APPARATUS, AND DATA RECORDING AND REPRODUCING METHOD

BACKGROUND OF THE INVENTION

1. Field of the Invention

The present invention relates to a data input/output apparatus, data input/output method, data recording and reproducing apparatus, and data recording and reproducing method, and more particularly, is suitably applied to a data recording and reproducing apparatus for recording and reproducing video data and audio data.

2. Description of the Related Art

A disk array device provided with a plurality of hard disk drives 2A to 2I as shown in FIG. 1 is available as a data recording and reproducing apparatus.

As this type of disk array device, several types of devices have been proposed depending on the method for distributing input data and parity data for each of the hard disk drives 2A to 2I or the like. However, at present, as shown in FIG. 1, a structure called "RAID-3" is widely used, wherein the input data is stripped (separated) for each bit or each byte in a disk array controller 3 to be read or written all at once by the plurality of hard disk drives 2A to 2H for recording and reproducing data and moreover, parity is generated based on the input data so as to be read and written by the dedicated hard disk drive 2I.

Actually, the disk array device 1 having such the structure has the advantage of being used as a recording and reproducing apparatus which has high reliability for record and reproduction because since the parity data is held in the dedicated hard disk, data distributed to each of the hard disk drives 2A to 2H can be reproduced from the parity data held in the hard disk drive 2I for parity data even when the hard disk drives 2A to 2H for recording and reproducing data break out and moreover, which has a transmission rate which is about N times as fast as an effective transmission rate of one of the hard disk drive 2A to 2H because a plurality of hard disk drive 2A to 2H (for example, N sets) are moved all at once to read and write the input data, and which has a volume which is about N times as large as that of one of the hard disk drive 2A to 2H.

As a consequence, in recent years, the use of the disk array device having such the structure has been proposed as a data recording and reproducing section of a recording and reproducing apparatus for video and audio data which requires a high data transmission rate and a large memory volume.

By the way, in recent years, cable television (CATV) broadcasting stations and general broadcasting stations are gradually demanding to replace a conventional recording and reproducing system for broadcasting programs, which comprises video tape recorders whose set number corresponds to the channel number, with one recording and reproducing apparatus, for coping with the multiplication of channels.

However, the number of channels which is required in this case largely differs depending on the application. Actually, for example, in the use called a broadcasting buffer for temporarily memorizing video and audio data before broadcasting programs, it is sufficient to have only three or four channels output. However, in the use called a near video on demand (NVOD) for broadcasting the same program such as a film or the like by shifting the program by a predetermined time, eight to sixteen channels or more outputs are required.

Consequently, in the case where the recording and reproducing apparatus for broadcasting programs is replaced by one set of recording and reproducing apparatuses, the recording and reproducing apparatus itself is required to be manufactured in a different manner depending on the required number of channels. As a result, since the structure is almost same but the type is different, there is a problem in that no merit is provided in cost, and it will be difficult to cope with the demand for an increased number of channels in the future.

SUMMARY OF THE INVENTION

In view of the foregoing, an object of this invention is to provide a data input/output apparatus, data input/output method, data recording and reproducing apparatus, and data recording and reproducing method which can cope with various applications.

The foregoing object and other objects of the invention have been achieved by the provision of a data input/output apparatus for inputting and outputting data, which comprises: a plurality of data input/output sections; a common data bus to which each of the data input/output sections are connected; and a control section, connected to the common data bus, for giving a useful right for the common data bus to each of the data input/output sections in order by a predetermined time, in which each of the data input/output sections occupies the data bus only when the useful right for data bus is given from the control section, and outputs the data to the data bus within the predetermined time or inputs the data via the data bus within the predetermined time.

Further, in the present invention for solving the aforementioned problem, a plurality of first input/output sections, a data recording and reproducing section for recording data transmitted from the first input/output sections via a data bus on a recording medium while reproducing data recorded on the recording medium in order to transmit the data to the corresponding first input/output section via the data bus, and a control means for giving a useful right by the data bus to each of the input/output sections in order for a predetermined time are connected to one data bus so that each of the input/output sections occupies the data bus only when the useful right is given from the control section, data is transmitted to the data recording and reproducing section via the data bus within a predetermined time, or data which is transmitted from the data recording and reproducing section via the data bus is taken in.

As a consequence, the data recording and reproducing apparatus can input and output data through a plurality of channels because each of the first input/output sections can exchange data with the data recording and reproducing section via the data bus in a time-division manner and in order without competing with other first input/output sections.

In this case, since the data recording and reproducing apparatus adopts a time-slot method for giving a useful right for the data bus to each of the first input/output sections by a predetermined time, the number of the first input/output sections to be connected to the data bus can be freely and easily changed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
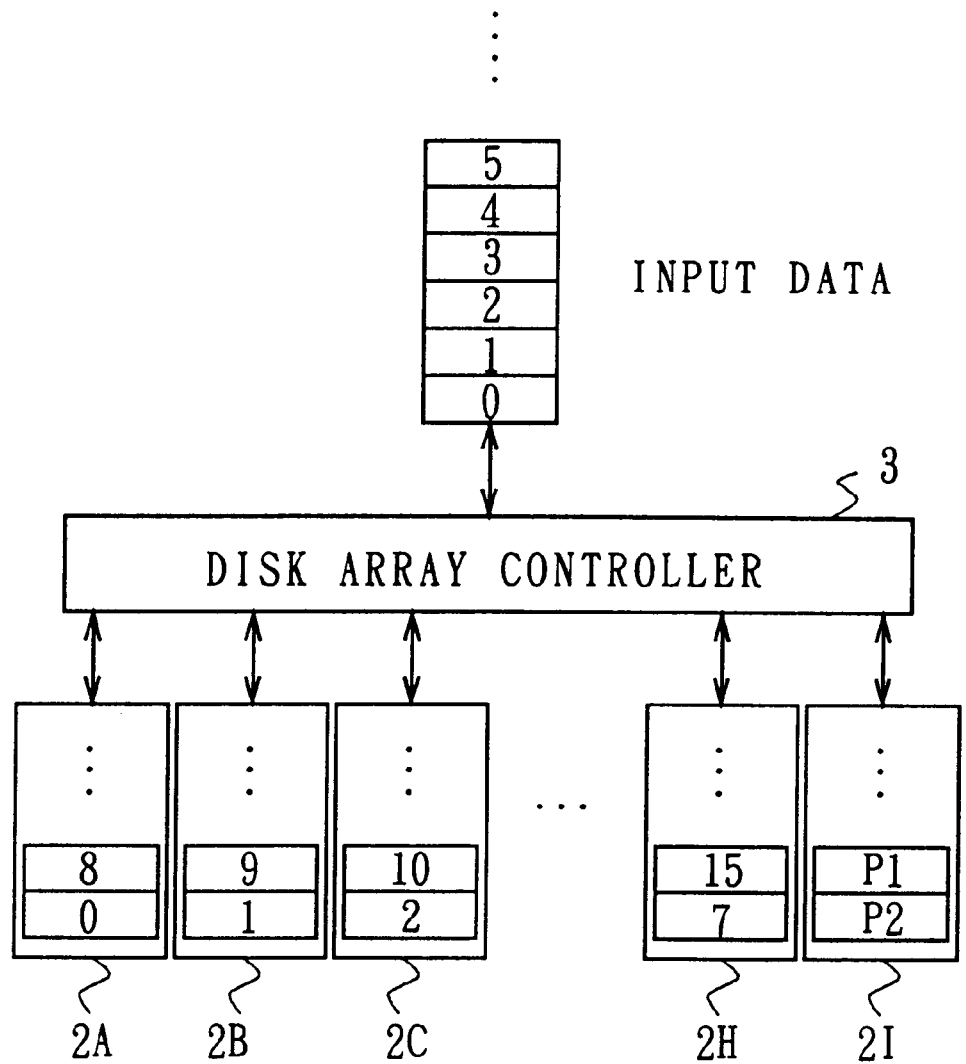
FIG. 1 is a block diagram showing a structure of a general disk array device.
Figure 2:
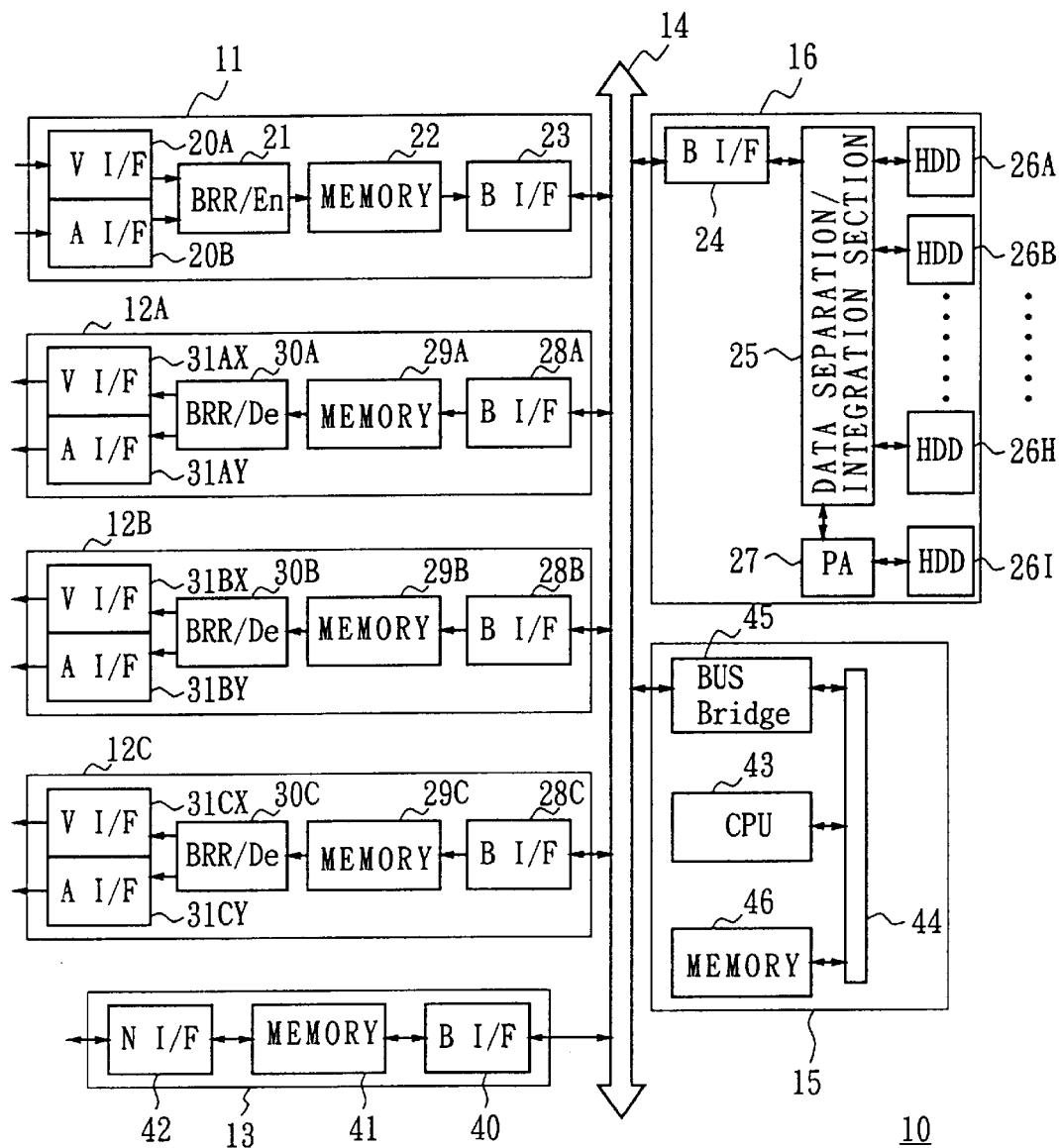
FIG. 2 is a block diagram showing a structure of a data recording and reproducing apparatus according to an embodiment.

Preferred embodiments of this invention will be described with reference to the accompanying drawings:

(1) Structure of the Data Recording and Reproducing Apparatus according to the Embodiment In FIG. 2, numeral 10 shows a data recording and reproducing apparatus according to the embodiment as a whole. One encode board 11, three decode boards 12A to 12C, and one interface board 13 are connected to one data bus 14 respectively and moreover, a control board 15 and a data recording and reproducing section 16 having a disk array structure are connected to the data bus 14.

In this case, the encode board 11 takes in video data and audio data which is supplied from the outside, via a video interface section 20A or an audio interface section 20B so that the data is compressed and coded at a bit rate reduction (BRR) encode section 21 to be converted into a predetermined recording format and then the obtained coded data is written in a buffer memory 22 in order. Further, in the encode board 11, the bus interface section 23 reads out the coded data written in the buffer memory 22 at a predetermined reading clock which is faster than a writing clock, and then transmits the coded data to the data recording and reproducing section 16 via the data bus 14.

At the time of the recording operation, the data recording and reproducing section 16 fetches in order the coded data which is transmitted via the data bus 14, via a bus interface section 24, and a data separation/integration section 25 separates the coded data in order every bit or byte. After that, the obtained bit or byte units of data (hereinafter, referred to as separation data) are distributed and given to a plurality of hard disk drives 26A to 26I for recording and reproducing data which are connected in parallel to the data separation/integration section 25, to be recorded on the hard disk. At this time, a parity calculating section 27 generates parity data based on each of the separation data which are sequentially supplied from the data separation/integration section 25 to record the data on the hard disk via the corresponding hard disk drive 26I.

Further, at the time of reproducing operation, the data recording and reproducing section 16 reads out the separation data distributed and recorded on the plurality of hard disks and the corresponding parity data recorded on a predetermined hard disk by driving the hard disk drives 26A to 26I all the same time. Then the read data are inputted to the data separation/integration section 25 or to the parity calculating section 27. At this time, while the data separation/integration section 25 uses the parity data supplied via the parity calculating section 27 according to necessity, the data separation/integration section 25 reproduces the original coded data by integrating the separation data which are respectively supplied from the hard disk drives 26A to 26H for recording and reproducing data, in order to transmit the original coded data to the corresponding decode board 12A to 12C or interface board 13 via the bus interface section 24 and the data bus 14.

In the decode boards 12A to 12C take in the coded data transmitted via the data bus 14, via the bus interface sections 28A to 28C respectively. While the coded data are written in the buffer memories 29A to 29C in order, the coded data written in the buffer memories 29A to 29C are read out at a predetermined reading clock which is later than a writing clock. The BRR decode sections 30A to 30C convert the coded data into the original video data and audio data by performing a decode processing and a predetermined processing, and then send them to the outside via the video data interface sections 31AX to 31CX or via the audio interface sections 31AY to 31CY, respectively.

On the other hand, in the interface board 13, the coded data transmitted via the data bus 14 are taken in via the bus interface section 40 and are written in the buffer memory 41 in order, and moreover, the coded data written in the buffer memory 41 are read out at a predetermined reading clock to be sent to an expanded unit 51 (FIG. 4) described later via the network interface section 42. In addition, in the interface board 13, the data that are supplied from the expanded unit 51 to the network interface section 42 are written in the buffer memory 41 in order, and are read out by the bus interface section 40 at a predetermined reading clock, and then are sent to the corresponding decode board 12A to 12C, data recording and reproducing section 16, or control board 15 via the data bus 14.

Here, in the case of the data recording and reproducing apparatus 10, data for each channel are transmitted via one data bus 14 under the control of a CPU 43 of the control board 15 so that the transmitted data do not collide with each other on the data bus 14.

Figure 3:
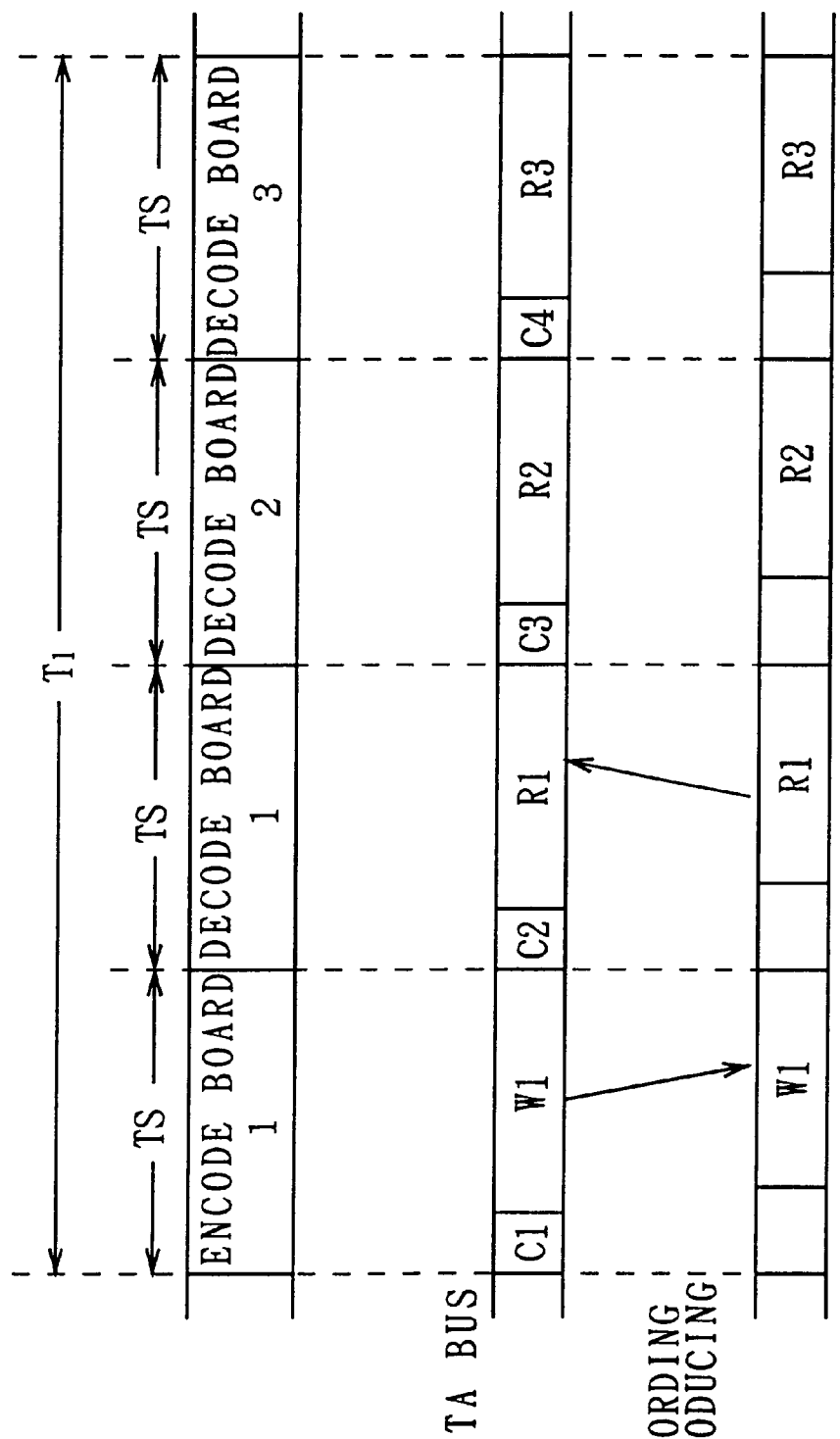
FIGS. 3A to 3C are timing charts explaining operation of the data recording and reproducing apparatus shown in FIG. 2.

Actually, in the case where the expanded unit 51 is not connected to the interface board 13, the CPU 43 first detects the total number of the encode board 11 and the decode boards 12A to 12C which are connected to the data bus 14, and determines the cycle time $T_1$ by assigning a predetermined time (hereinafter, referred to as time slot TS) to each of the encode board 11 and the decode boards 12A to 12C as shown in FIG. 3A.

After that, as shown in FIG. 3B, the CPU 43 gives commands C1 to C4 (hereinafter, referred to as useful permission commands) for permitting the use of the data bus 14 to the corresponding interface sections 23, 28A to 28C of the encode board 11 and the decode boards 12A to 12C, and the bus interface section 24 of the data recording and reproducing section 16 at the beginning of the time slots TS respectively, via the CPU bus 44, a bus bridge 45, and the data bus 14 in order.

Further, at this time, when a writing command is given from an external controller (not shown), the CPU 43 sends information (hereinafter, referred to as data writing position designating information), which is given from the external controller, for designating a writing position to a hard disk, together with the useful permission command C1, to the bus interface section 23 of the encode board 11. On the other hand, when a reading command is given from the external controller, the CPU 43 sends information (hereinafter, referred to as reading data designating information), which is given from the external controller, for designating data to be read, together with the data useful permission commands C2 to C4, to the interface sections 28A to 28C of the corresponding decode boards 12A to 12C.

As a consequence, only when the useful permission command C1 is given from the CPU 43, the bus interface section 23 of the encode board 11 sends the writing command and the writing position designating information to each of the hard disk drives 26A to 26I via the interface section 24 of the data recording and reproducing section 16 within the time of the assigned time slot TS, and then reads out the coded data from the buffer memory 22 and transfers the coded data to the data recording and reproducing section 16 via the data bus 14 to record it on the designated position of each of the hard disks.

Further, only when the useful permission commands C2 to C4 respectively are given from the CPU 43, each of the bus interface sections 28A to 28C of the decode boards 12A to 12C makes the hard disk drives 26A to 26I read out the separation data or the parity data, by sending the reading command and the reading data designation information via the data bus 14 and the interface section 24 of the data recording and reproducing section 16 in order, within the time of assigned time slot TS. On the other hand, the bus interface sections 28A to 28C take in the coded data outputted from the data recording and reproducing section 16 to the data bus 14, in order as a consequence and write them in the buffer memories 29A to 29C respectively.

In this manner, in the data recording and reproducing apparatus 10, the recording operation and the reproducing operation are carried out in a time-division manner under the control of the CPU 43 of the control board 15, so that the video data and the audio data can be inputted and outputted through a plural channels without competing the data transmission between the encode board 11 and the data recording and reproducing section 16 with the data transmission between each of the decode boards 12A to 12C and the data recording and reproducing section 16.

Consequently, the data recording and reproducing apparatus 10 uses the buffer memories 22, 29A to 29C of the encode board 11 and the decode boards 12A to 12C having a memory capacity which is at least four times as large as the amount of data to be written within one time slot TS. Thereby, at the recording operation and the reproducing operation, the coded data can be read and written without causing an over-flow or under-flow with respect to the buffer memory 22 of the encode board 11 or to each of the buffer memories 29A to 29C of the decode boards 12A to 12C.

Figure 4:
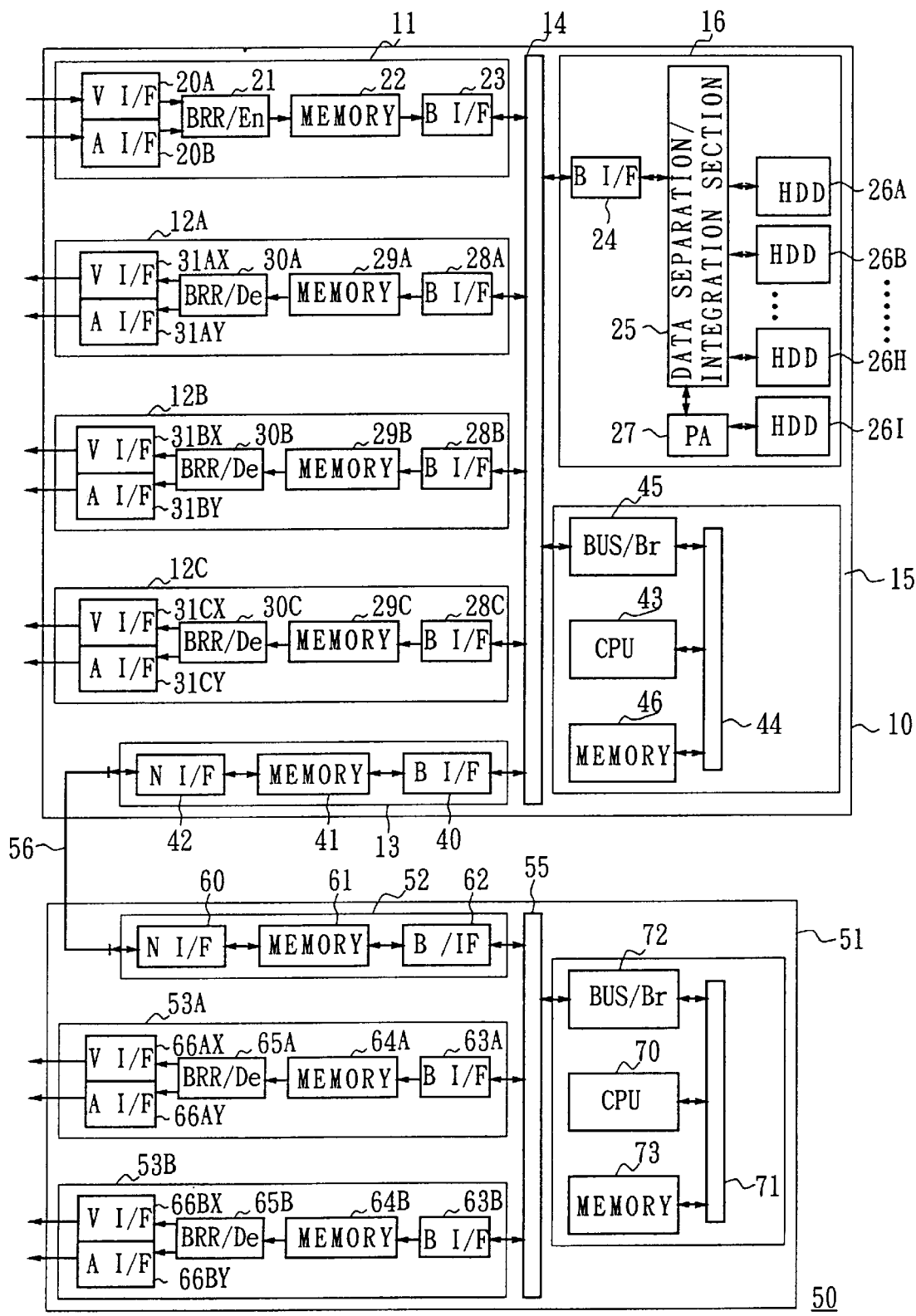
FIG. 4 is a block diagram showing one example where the number of channels of the data recording and reproducing apparatus shown in FIG. 2 is increased.

FIG. 4 in which the same reference numerals are applied to parts corresponding to FIG. 2 shows a state in which the extended unit 51 is connected to the data recording and reproducing apparatus 10 for increasing the number of channels.

In this case, the extended unit 51 is constituted in such a manner that one interface board 52 having the same structure as the interface board 13 of the data recording and reproducing apparatus 10, two decode boards 53A and 53B having the same structure as the decode boards 12A to 12C of the data recording and reproducing apparatus 10, and one control board 16 having the same structure as the control board 15 of the data recording and reproducing apparatus 10 are connected to one data bus 55 respectively. And, the network interface section 60 of the interface board 52 is connected to the data recording and reproducing apparatus 10 by being connected to the network interface section 42 of the interface board 13 of the data recording and reproducing apparatus 10 via a cable 56.

Therefore, in the data recording and reproducing system 50 comprising the data recording and reproducing apparatus 10 and the extended unit 51, the data bus 14 of the data recording and reproducing apparatus 10 and the data bus 55 of the extended unit 51 are used as one data bus via the interface board 13 of the data recording and reproducing apparatus 10, the cable 56, and the interface board 52 of the extended unit 51.

In this case, at the time of the operation, the CPU 43 of the control board 15 of the data recording and reproducing apparatus 10 first detects the total number of the encode board 11 and the decode boards 12A to 12C in the data recording and reproducing apparatus 10 and inquires the CPU 70 of the control board 16 of the extended unit 51 for the total number of the encode board and the decode boards 53A, 53B of the extended unit 51 via the interface board 13 of the data recording and reproducing apparatus 10, the cable 56, and the interface board 52 of the extended unit 51, in order to detect the total number of the encode board 11 and the decode boards 12A to 12C, 53A, 53B, which are directly connected to the data bus 14 of the data recording and reproducing apparatus 10 or are indirectly connected via the interface board 13.

Figure 5:
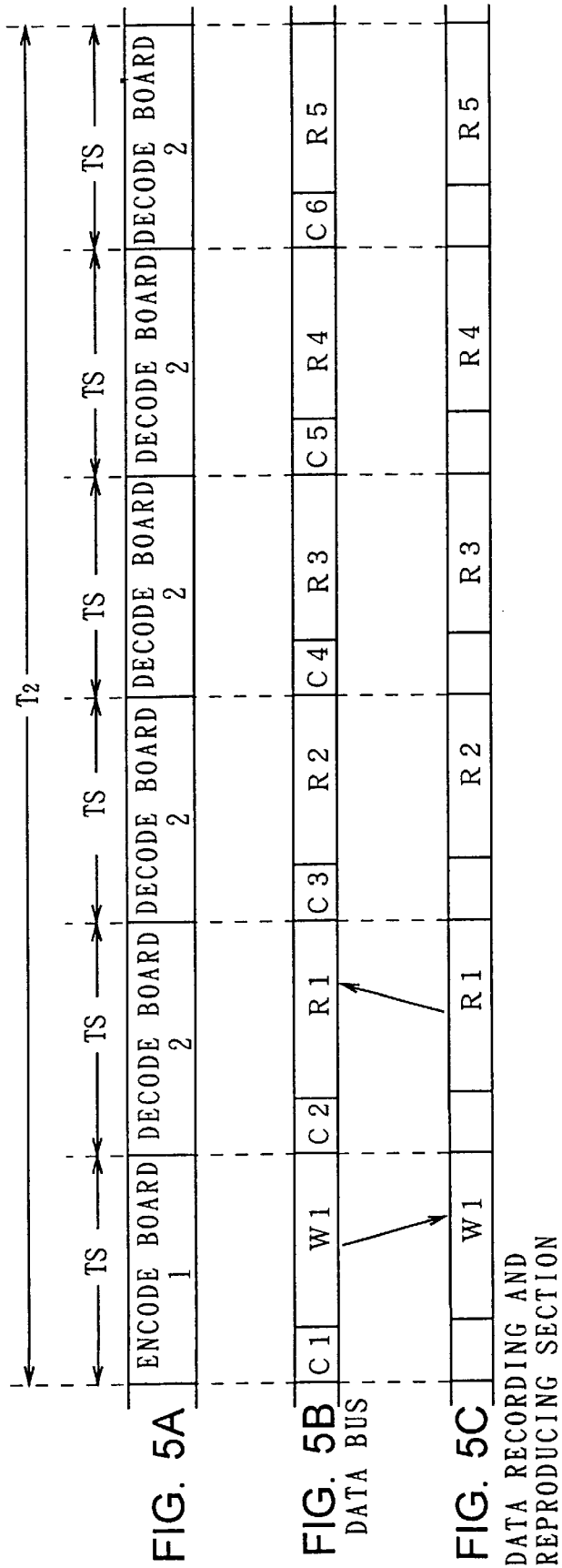
FIGS. 5A to 5C are timing charts explaining operation of the data recording and reproducing system shown in FIG. 4.

Next, the CPU 43 determines the cycle time $T_2$ by assigning a predetermined time slot TS to each of the encode board 11 and decode boards 12A to 12C, 53A, 53B on the basis of the obtained total number of the encode board 11 and the decode boards 12A to 12C, 53A and 53B, as shown in FIG. 5A.

After that, at the time slot TS for the encode board 11 and each of the decode boards 12A to 12C in the data recording and reproducing apparatus 10, the CPU 43 sends the useful permission commands C1 to C4 for the data bus 14 to the corresponding encode board 11 or decode board 12A to 12C and moreover, as the similar way to the operation of the CPU 43 in the aforementioned case where the extended unit 51 is not connected, the CPU 43 sends the writing position designating information or the read data designating information when the writing command or the reading command is given from the external controller (not shown) respectively. On the other hand, at the time of the time slot TS assigned to each of decode boards 53A and 53B in the extended unit 51, the CPU 43 of the data recording and reproducing apparatus 10 sends a control signal to the CPU 70 of the control board 16 of the extended unit 51 via the interface board 13 of the data recording and reproducing apparatus 10, the cable 56, and the interface board 52 of the extended unit 51 in order to make the CPU 70 send the useful permission commands C5 and C6 for the data bus 14 of the data recording and reproducing apparatus 10 and the read data designating information similarly to the aforementioned case where the extended unit 51 is not connected, to the bus interface section 63A, 63B of the corresponding decode board 53A, 53B in the extended unit 51.

Consequently, within the time of assigned time slot TS only when the useful permission commands C5 and C6 are respectively given from the CPU 70 of the extended unit 51, similarly to each of the decode boards 12A to 12C in the data recording and reproducing apparatus 10, the bus interface sections 63A, 63B of the decode boards 53A, 53B of the extended unit 51 make the hard disk drives 26A to 26H read the corresponding separation data or the parity data by sending a reading command and reading data designating information via the data bus 55 of the extended unit 51, the interface board 52 of the extended unit 51, the cable 56, the interface board 13 of the data recording and reproducing apparatus 10, the data bus 14 of the data recording and reproducing apparatus 10, and the interface section 24 of the data recording and reproducing section 16 in order, with the result that the coded data that is outputted to the data bus 14 from the data recording and reproducing section 16 is taken in via the data bus 14, the cable 56, and the data bus 55 of the extended unit 51 in order to be written in the buffer memories 63A, 64B.

In this manner, in the data recording and reproducing apparatus 10, time slots TS are assigned in order to all of the encode board 11 and decode boards 12A to 12C, 53A and 53B which are directly connected to the data bus 14 or indirectly connected via the interface board 13 respectively so that the data bus 14 is occupied within the corresponding time slots TS. Thereby, all of the encode board 11 and decode boards 12A to 12C which are directly connected to the data bus 14 and indirectly connected via the interface board 13 can transmit coded data to the data recording and reproducing section 16 via the data bus 14 in an equal manner.

Further, in the aforementioned embodiment, the extended unit 51 is mounted with the decode boards 53A and 53B, however, the coded data can be transferred between the data recording and reproducing section 16 and the extended unit 51 similarly to the aforementioned configuration even if the extended unit 51 is mounted with encode boards having the same structure as the data recording and reproducing apparatus 10. In addition, even if an extended unit is mounted with the encode board 11 and the decode boards 12A to 12C of the data recording and reproducing apparatus 10, the extended unit can be constructed similarly to the aforementioned extended unit 51 and coded data can be transferred via the data bus 14 between the data recording and reproducing section 16 and each of the encode board and decode boards.

(2) Operation and Advantage of the Embodiment

In the aforementioned configuration, in the data recording and reproducing apparatus 10, at the time of the operation the CPU 43 of the control board 15 assigns time slots TS to all the encode board 11 and decode boards 12A to 12C, 53A, 53B which are directly connected to the data bus 14 or indirectly connected via the interface board 13 respectively. Thereby, a useful permission for the data bus 14 is given to the encode board 11 or decode board 12A to 12C, 53A, 53B corresponding to each time slot TS and to the data recording and reproducing section 16 described above while information necessary for reading and writing coded data is given to the corresponding encode board 11 or decode board 12A to 12C, 53A, 53B.

As a result, the encode board 11 or the decode board 12A to 12C, 53A, 53B, to which the useful permission for the data bus 14 is given, occupies the data bus 14 within the assigned time slot TS to transmit the coded data to the data recording and reproducing section 16 or to taken in the coded data which is supplied from the data recording and reproducing section 16 through the data bus 14.

Therefore, in the data recording and reproducing apparatus 10, since the number of encode board 11 and the decode boards 12A to 12B in the apparatus 10 can be freely changed in accordance with the number of necessary channels, it is not necessary to manufacture the apparatus 10 in a different manner depending upon the number of channels. Furthermore, since the number of channels can be increased merely by connecting the encode board or the decode boards 53A, 53B to encode board 11 and decode boards 12A to 12C in the data recording and reproducing apparatus 10 in parallel via the interface board 13, the number of channels can be easily increased in future.

In the aforementioned structure, the encode board 11, the decode boards 12A to 12C, the interface board 13, the data recording and reproducing section 16, and the control board 15 are connected to one data bus 14 and moreover, all of the encode board 11 and decode boards 12A to 12C, 53A, 53B which are directly connected to the data bus 14 or indirectly connected via the interface board 13 occupy the data bus 14 in order for a predetermined time respectively, so that it is not necessary to manufacture the apparatus in a different manner depending upon the number of channels and extension of the number of channels can be easily handled. Thus, a data recording and reproducing apparatus having a high extendibility which can cope with various applications can be realized.

(3) Other Embodiments

Note that, in the aforementioned embodiment, a disk array device having a RAID-3 structure is applied as the data recording and reproducing section 16 of the data recording and reproducing apparatus 10. However, the present invention is not limited thereto and various other structures can be applied.

In this case, in the aforementioned embodiment, hard disks or hard disk drives are applied as the recording medium and the recording and reproducing means for recording and reproducing coded data. However, other recording medium and recording and reproducing means can be widely applied.

In the aforementioned embodiment, the present invention is applied to the data recording and reproducing apparatus 10 for recording and reproducing video data and audio data. However, the present invention is not limited thereto and can be applied to various kinds of data recording and reproducing apparatuses for recording and reproducing data other than video data and audio data.

Further, in the aforementioned embodiment, the input/output section for inputting data from the outside or outputting data to the outside comprises the encode board 11 for converting video data and audio data which is supplied into the coded data of a predetermined recording format by compressing and coding, and the decode boards 12A to 12C for converting the coded data which is supplied into the original video data and audio data by decoding and predetermined processing. However, the present invention is not limited thereto and other various structures for performing other kinds of data processing can be applied to the input/output section for inputting data from the outside and outputting data to the outside.

Further, in the aforementioned embodiment, the cycle times $T_1$ and $T_2$ are determined by respectively assigning predetermined time slots TS to all of the encode board 11 and decode boards 12A to 12C, 53A, 53B which are directly connected to the data bus 14 or are indirectly connected via the interface board 13. However, the present invention is not limited thereto and time slots TS can be determined in such a manner that the cycle times $T_1$ and $T_2$ are previously set to predetermined values and the cycle time $T_2$ is evenly assigned to all of the encode board 11 and decode boards 12A to 12C, 53A, 53B which are directly connected to the data bus 14 or indirectly connected via the interface board 13.

Further, in the aforementioned embodiment, the extended unit 51, which is constituted by connecting one interface board 52, two decode boards 53A, 53B, and one control board 16 to the data bus 55 as shown in FIG. 4, is connected to the data recording and reproducing apparatus 10 to which the present invention is applied, resulting in increasing the number of channels. However, the present invention is not limited thereto. For example, as shown in FIG. 6, a second data recording and reproducing apparatus 82 having almost the same construction as the first data recording and reproducing apparatus 81 to which the present invention is applied is connected to the first data recording and reproducing apparatus 81 via a cable 83, and the two data recording and reproducing apparatuses 81, 82 can be operated in parallel to increase the number of channels.

Figure 6:
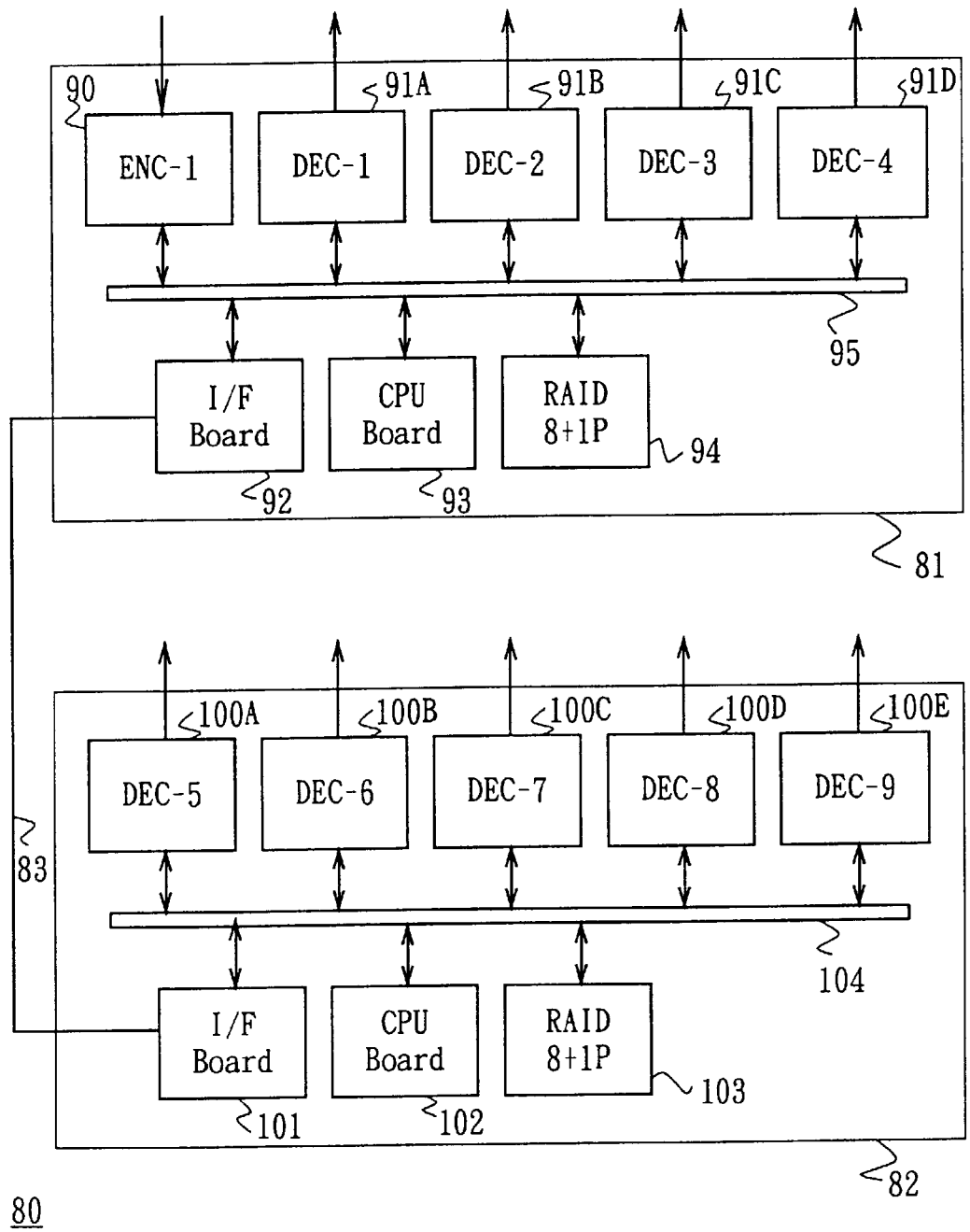
FIGS. 6 and 7 are block diagrams showing other embodiments.

Note that, in FIG. 6, the first data recording and reproducing apparatus 81 is constituted by connecting one encode board 90, four decode boards 91A to 91D, one interface board 92, one control board 93, and a data recording and reproducing section 94, which are respectively constructed similarly to the encode board 11, decode boards 12A to 12C, interface board 13, control board 15, and data recording and reproducing section 16 of FIG. 2, to a data bus 95. Further, the second data recording and reproducing apparatus 82 is constituted by connecting five decode boards 100A to 100E, one interface board 101, one control board 102, and a data recording and reproducing section 103, which are respectively constructed similarly to the decode boards 12A to 12C, the interface board 13, the control board 15, and the data recording and reproducing section 16 of Fig. 2, to a data bus 104, and the interface board 101 is connected to the interface board 92 of the first data recording and reproducing apparatus 81 via the cable 83.

Therefore, in the data recording and reproducing system 80 which comprises the first and second data recording and reproducing apparatuses 81 and 82, each of the data buses 95 and 104 in the first and the second data recording and reproducing apparatuses 81, 82 becomes a common data bus for all of the encode board 90, the decode boards 91A to 91D, 100A to 100E by connecting the interface boards 92, 101 and the cable 83, and more over, one of CPUs (not shown) installed in the control boards 93, 102 of the data recording and reproducing apparatuses 81 and 82 controls all of the encode board 90, decode boards 91A to 91D, 100A to 100E, and data recording and reproducing sections 94, 103 in the first and second data recording and reproducing apparatuses 81, 82 by using time slots. Therefore, the first and second data recording and reproducing apparatuses 81, 82 have an advantage of being able to use the data recording and reproducing section 94, 103 in the first or the second data recording and reproducing apparatus 81, 82 on the another side as a data resource. In other words, when the first data recording and reproducing apparatus 81 is operated as a single entity, the number of channels being 1-IN/4-OUT can be extended to 1-IN/9-OUT by operating the first and the second data recording and reproducing apparatuses 81 and 82 in parallel.

Figure 7:
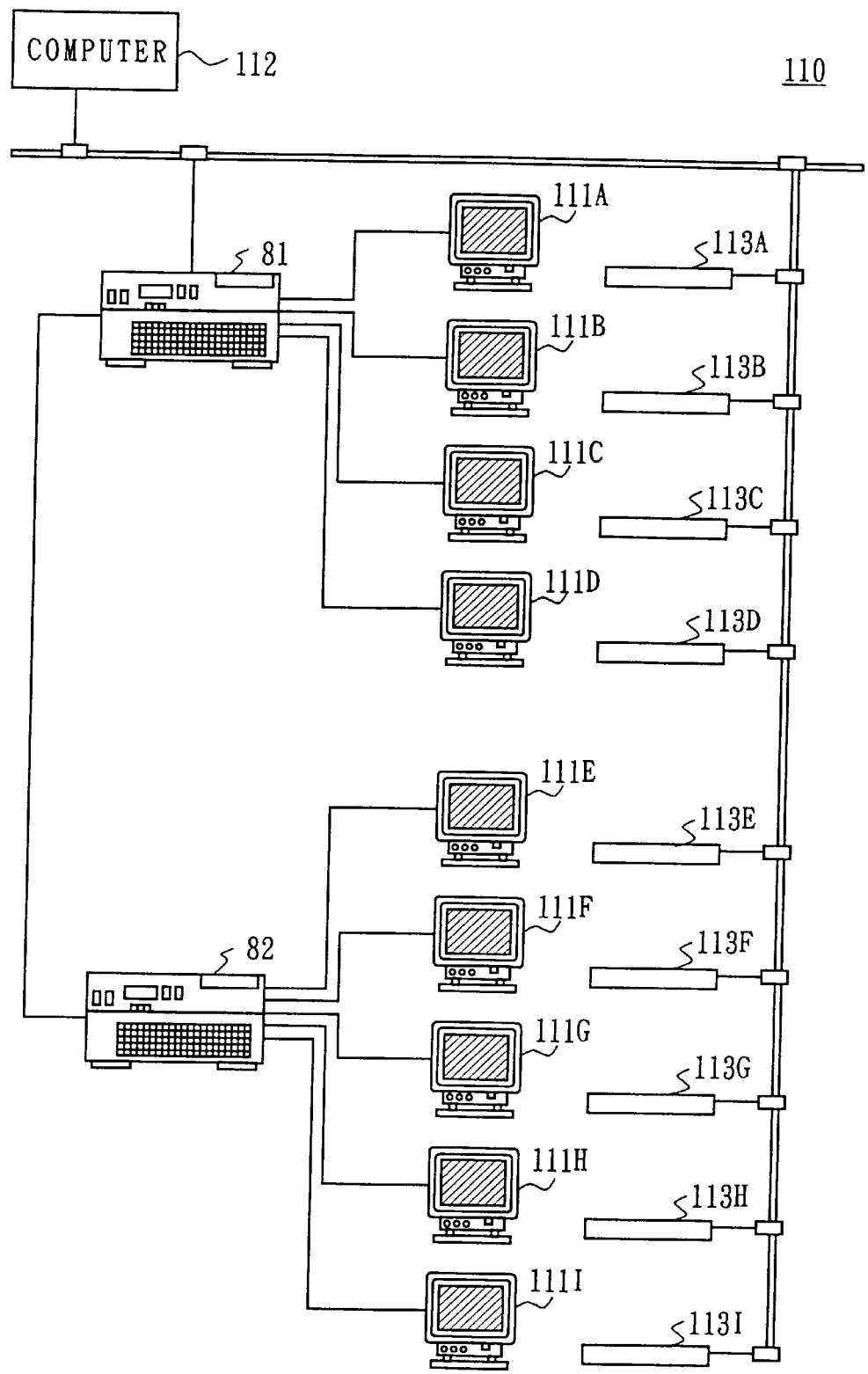

Further, for example, a CATV system 110 shown in FIG. 7 can be constructed by using the first and second data recording and reproducing apparatuses 81, 82.

Actually, the CATV system 110 is constituted so that the output of each of the decode boards 91A to 91D, 100A to 100E of the first and second data recording and reproducing apparatuses 81, 82 is sent to monitors (television receivers) 111A to 111I of contract viewers' houses.

In this case, the computer 112 for controlling the system 110 as a whole controls a CPU installed in the control board 93 of the first data recording and reproducing apparatus 81 on the basis of the requests for supply of program from program selectors 113A to 113I which the contract viewers have, in order to send out a requested program to the viewers.

Therefore, the data recording and reproducing apparatuses 81, 82 to which the present invention is applied can be increased by constituting the CATV system in this manner. And the increase in the number of contracted viewers and supplied programs can be coped with as described above by connecting and operating the data recording and reproducing apparatuses 81, 82 in parallel.

According to the present invention as described above, in the data recording and reproducing apparatus, a plurality of first input/output sections, a data recording and reproducing section for recording data, which is transmitted from the first input/output sections via a data bus, on a recording medium while reproducing the data recorded on the recording medium to transmit the data to the corresponding first input/output section via the data bus, and a control means for giving a useful right for the data bus to the respective input/output sections in order by a predetermined time are connected to one data bus, and each of the input/output sections occupies the data bus only when the useful right is given from the control section, in order to transmit data to the data recording and reproducing section via the data bus or to taken in data which is transmitted from the data recording and reproducing section via the data bus. Therefore, the number of first input/output sections to be connected to the data bus can be freely and easily changed, and thus a data recording and reproducing apparatus capable of coping with various applications can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data input/output apparatus for inputting and outputting data, comprising:

a plurality of data input/output sections;

a common data bus to which each of said data input/output sections is connected; and a control section, connected to said common data bus, for giving a useful right for access to said common data bus to each of said data input/output sections in order for a predetermined time, wherein each of said data input/output sections occupies said data bus for an equal amount of time only when said useful right for access to said data bus is given from said control section, and outputs said data to said data bus within said predetermined time or inputs said data via said data bus within said predetermined time, and wherein said useful right for access to said common data bus given to each of said data input/output sections is assigned on the basis of the number of data input/output sections.

2. The data input/output apparatus according to claim 1, further comprising interface means connected to said data bus, wherein said control section, when other data input/output sections are connected to said data input/output sections via said data bus and said interface means, gives said useful right for data bus to said data input/output sections and said other input/output sections which are connected to said data bus, in order by a predetermined time.

3. A data recording and reproducing apparatus comprising:
  a data bus;
  a plurality of input/output sections, connected to said data bus, for inputting data from the outside and outputting data to the outside;
  a data recording and reproducing section, connected to said data bus, for taking in said data which is transmitted from said first input/output sections via said data bus to record said data on a recording medium and for reproducing said data recorded on the recording medium to transmit said data to said corresponding first input/output section via said data bus; and
  a control means, connected to said data bus, for giving a useful right for access to said data bus to each of said input/output sections in order for a predetermined time,
  wherein each of said input/output sections occupies said data bus for an equal amount of time when said useful right is given from said control means, and transmits said data to said data recording and reproducing section via said data bus within said predetermined time or receives said data which is transmitted from said data recording and reproducing section via said data bus, and
  wherein said useful right for access to said data bus given to each of said input/output sections is assigned on the basis of the number of input/output sections.

4. The data recording and reproducing apparatus according to claim 3 wherein:
  said data recording and reproducing section further comprises a plurality of recording and reproducing means; and
  when said data is recorded, said data which are transmitted from said first input/output sections via said data bus are allotted to each predetermined unit and recorded in a plurality of said recording input/output mediums via said plurality of recording and reproducing means, and when said data recorded in said recording medium is reproduced, said allotted data is integrated to be transmitted to said first input/output sections via said data bus.

5. The data recording and reproducing apparatus according to claim 4, wherein
  said recording mediums are hard disks, and said recording and reproducing means has an array structure where a plurality of hard disk drives are arrayed.

6. The data recording and reproducing apparatus according to claim 3, wherein:
  an interface section is further connected to said data bus; and
  said control means, when second input/output sections having the same structure as said first input/output sections are connected to said data bus via said interface section, gives said useful right for data bus to all of said first and second input/output sections connected to said data bus in order by a predetermined time.

7. A data input/output method of inputting and outputting data which is inputted and outputted from/to a plurality of data input/output means connected to a common data bus and controlled by a control section connected to said data bus, said data input/output method comprising:
  a first step of determining a time slot to assign a predetermined time to a plurality of data input/output means connected to said data bus based on the number of data input/output means;
  a second step of sending useful permission information for access to said data bus to every time slot from said control section to said data input/output means to which said time slot is assigned; and
  a third step, occurring when said useful permission information is given, of occupying said data bus in equal amounts of time to output said data to said data bus within said time slot or to input said data via said data bus within said time slot by said data input/output means.

8. The data input/output method according to claim 7, wherein
  when interface means is further connected to said data bus and other data input/output means having the same structure as said data input/output means are further connected to said data bus via said interface means, said control section determines a time slot to assign said predetermined time to said other data input/output means in addition to said plurality of data input/output means at said first step, said control section sends said bus useful permission information to said data input/output means and said other data input/output means at said second step, said data input/output means and said other data input/output means occupy said data bus only when said bus useful permission information is given, to output said data to said data bus within said time slot or to input said data via said data bus within said time slot, at said third step.

9. A data recording and reproducing method, wherein a common data bus transfers recording or reproducing data in/from a data recording and reproducing section via said data bus from a plurality of first data input/output sections for inputting and outputting data from/to the outside, said data recording method and reproducing comprising:
  a first step of determining a time slot to assign a predetermined time to said respective data input/output sections based on the number of data input/output sections;
  a second step of sending useful permission information for access to said data bus to each of said first data input/output sections to which said time slot is assigned; and
  a third step, occurring when said useful permission information is given, of occupying said data bus in equal amounts of time by each of said data input/output sections, to transmit said data to said data recording and reproducing section via said data bus within said time slot or to take in said data which is transmitted from said data recording and reproducing section via said data bus within said time slot.

10. The data recording and reproducing method according to claim 9, wherein:
  said data recording and reproducing section has a plurality of recording and reproducing means respectively provided with a plurality of recording mediums; and
  the data recording and reproducing method further has a fourth step of allotting and recording said data which is transmitted from said first data input/output section via said data bus, in said plurality of recording mediums by a predetermined unit when said data is recorded, and of integrating and transmitting said allotted data to said first input/output sections when said data recorded in said recording mediums are reproduced.

11. The data recording and reproducing method according to claim 9, wherein
  said recording mediums are hard disks and said recording and reproducing means has an array structure in which a plurality of said hard disk drives are arrayed.

12. The data recording and reproducing method according to claim 9, wherein when an interface section is further connected to said data bus and second data input/output sections having the same structure as said first data input/output sections are further connected to said data bus, said first step determines a time slot to assign a predetermined time to said second input/output sections in addition to said first data input/output sections, said second step sends said data bus useful permission information to said first or second data input/output sections to which said time slot is assigned, said third step occupies said data bus by said first or second data input/output sections only when said bus useful permission information is given, to output said data to said data bus within said time slot or to input said data via data bus within said time slot.

13. The data recording and reproducing method according to claim 9, wherein when a writing command for writing said data to said data recording and reproducing section is transmitted from the outside, said second step sends said data bus useful permission information to each of said first data input/output sections to which said time slot is assigned and sends writing position designating information for designating writing position of said recording and reproducing section to said first data input/output sections.

14. The data recording and reproducing method according to claim 9, wherein:

when a reading command for reproducing data recorded in said data recording and reproducing section is transmitted from the outside, said second step sends said data bus useful permission information to said first data input/output sections to which said time slot is assigned and sends reading data designating information for designating desired data of said data recording and reproducing sections to said first data input/output sections.

* * * * *